United States Patent
Higashiyama (12)

(10) Patent No.: US 6,418,272 B1
(45) Date of Patent: Jul. 9, 2002

(54) IMAGE PICKUP APPARATUS, COMPUTER READABLE RECORDING MEDIUM AND METHOD FOR PREPARING AND AUDIO FILE

(75) Inventor: Teruyuki Higashiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/084,404

(22) Filed: May 27, 1998

(30) Foreign Application Priority Data

May 27, 1997 (JP) ............................................. 9-136532
May 19, 1998 (JP) ........................................... 10-136735

(51) Int. Cl.[7] ........................... H04N 5/77; H04N 5/928
(52) U.S. Cl. ...................................... 386/104; 386/107
(58) Field of Search ......................... 386/104, 95, 96, 386/102, 107, 117, 46, 39, 1, 38, 54, 99; H04N 5/77, 5/928

(56) References Cited

U.S. PATENT DOCUMENTS 4,777,537 A * 10/1988 Ueno et al. .................... 386/96

FOREIGN PATENT DOCUMENTS

JP          7-184160          7/1995

* cited by examiner

Primary Examiner—Robert Chevalier
(74) Attorney, Agent, or Firm—Fitzpatrick, Cella, Harper & Scinto

(57) ABSTRACT

In an electronic camera capable of audio recording, easy file management is attained in case of preparing an audio file, corresponding to an image file. When a shutter button is depressed, a microcontroller causes an image recording subsystem to prepare an image file and store it in a memory device. Then audio information is entered from a microphone under the depression of a recording button, an audio recording subsystem prepares an audio file and stores it in the memory device, corresponding to the image file. Thereafter, the audio information is added to the audio file at each entry of the audio information under the depression of the recording button. Then the shutter button is depressed to prepare a new image file, and a new audio file is prepared in response to the subsequent entry of audio information. As a result, only one audio file is prepared corresponding to each image file.

16 Claims, 9 Drawing Sheets

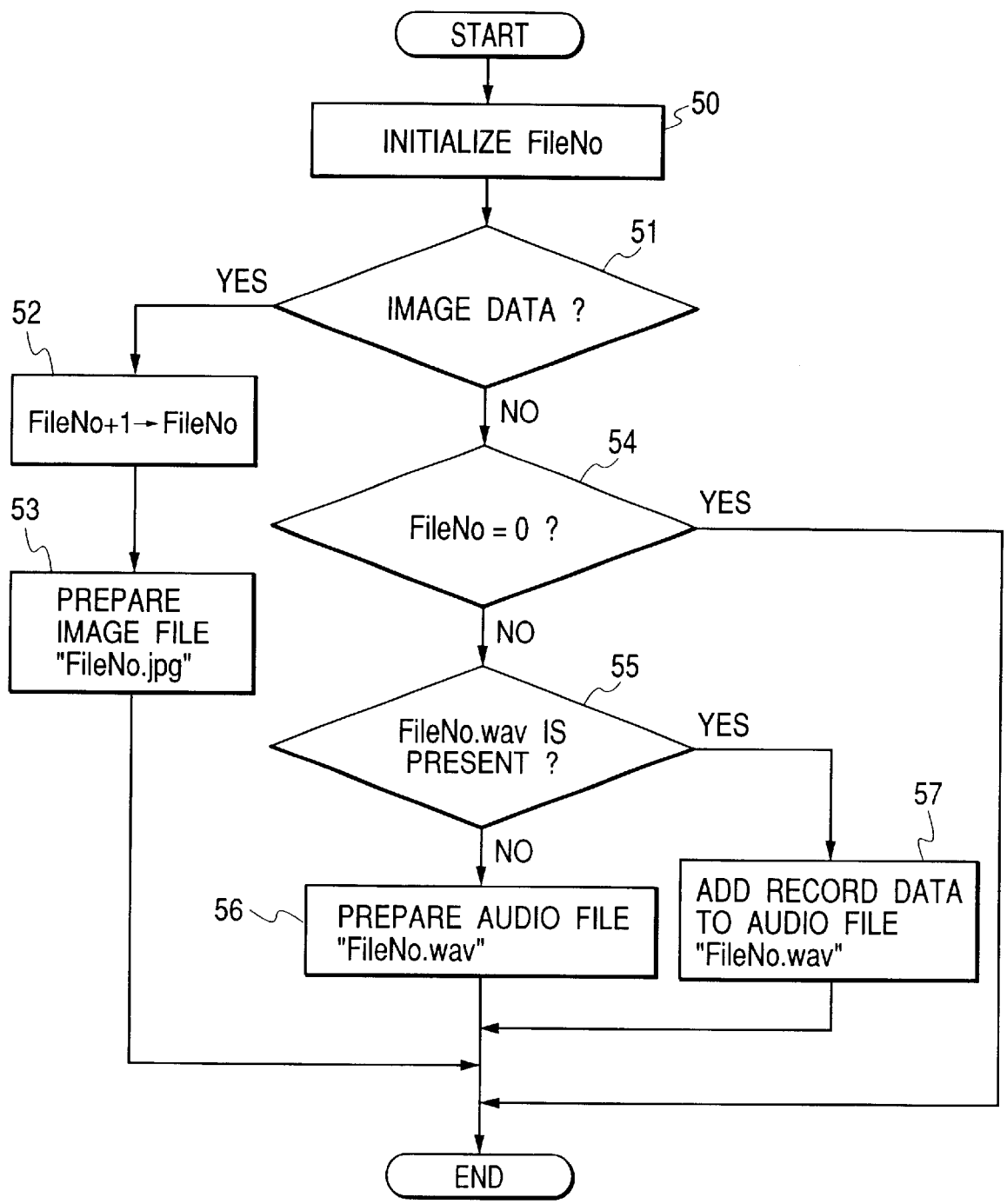

| FILE NAME | RENEWAL TIME |
|---|---|
| 1. jpg | 03/25/1998 12:00 |
| 1. wav | 03/25/1998 12:10 |
| 2. jpg | 03/25/1998 12:15 |
| 2. wav | 03/25/1998 12:16 |
| 3. jpg | 03/25/1998 12:30 |
| 4. jpg | 03/25/1998 12:45 |
| 5. jpg | 03/26/1998 13:00 |
| 5. wav | 03/26/1998 13:01 |
| 6. jpg | 03/26/1998 12:00 |
| 6. wav | 04/01/1998 12:00 |

| MM/DD/YY |
|---|

IMAGE PICKUP APPARATUS, COMPUTER READABLE RECORDING MEDIUM AND METHOD FOR PREPARING AND AUDIO FILE

BACKGROUND OF THE INVENTION

1. Field of the Invention

The present invention relates to an image pickup apparatus, a computer readable recording medium and a method for preparing an audio file.

2. Related Background Art

FIG. 13 is a rear view of a conventional electronic camera provided with audio information recording function, wherein shown are a view finder 21 for confirming the object or the image to be recorded; a shutter button 105 for instructing image recording to the camera; a recording button 106 for instructing audio information recording to the camera; and a microphone 107 for fetching the voice.

When the shutter button 105 is depressed, the electronic camera captures the image displayed on the view finder 21 and stores it as a file in a memory device in the electronic camera.

Also, by speaking into the microphones 107 during depression of the recording button 106, audio information can be stored as a file in the memory device of the electronic camera. The recording of the audio information is terminated when the recording button 106 is released.

The audio information is recorded as complementary information to the most recently recorded image. Audio information cannot be recorded in a state in which no image has been captured.

A new file is prepared in two cases, namely:

1) when image data is captured by the depression of the shutter button; and 2) when audio data is captured by the depression of the recording button.

The image file name has "jpg" as a suffix accompanying the final dot ".", while the audio file name has "wav" as a suffix.

In the following there will be explained steps 30–37 in FIG. 11. At first a step 30 initializes the variable FileNo, by searching the files stored in a memory device 104 and employing the largest value of the prefixes of the stored image files. For example, if the memory device 104 stores five files, 1.jpg, 2.jpg, 3.jpg, 3.wav and 4.jpg, the variable FileNo is initialized to "4". If no image files are stored, it is initialized to "0". The method of searching the files stored in the memory device is already well known and will not be explained in detail.

Then a step 31 executes an increment of the variable FileNo by one. Then a step 32 discriminates whether the file to be prepared is an audio file or an image file, and, in the case of an image file, a step 33 prepares an image file with a file name File No. jpg. On the other hand, if the file to be prepared is an audio file, a step 34 judges the value of the file number in order to discriminate whether any image file has been prepared, and, if the value of the file number is "1", indicating that no image has been captured, the audio file is not prepared but the sequence proceeds to a step 37 to terminate the process. On the other hand, if an image already has been captured, a step 35 prepares an audio file with a file name FileNo.wav. The prepared file is registered in a management file in a step 36.

In summary, in the above-described flow, a new file is prepared in response to every capture of image or audio data and the prepared file is registered in the management file. The management file indicates the image file to which each audio file is complementary.

FIG. 12 is a flow chart showing the procedure of registration into the management file.

The management file contains the file name of an image file and the name of the audio file which is complementary information to the image file. The management file is represented by a name such as 1.ctg or 2.ctg, in which the suffix ctg is an identifier indicating a management file.

Referring to FIG. 12, a step 40 at first initializes a variable CtgNo by searching the files stored in the memory device 104 and employing the largest value of the prefixes of the stored management files. For example if the memory device 104 contains four files 1.ctg, 2.ctg, 3.ctg and 4.ctg, the variable FileNo is initialized to "4". If no management file has been recorded, it is initialized to "0".

Then a step 41 discriminates whether the file to be registered is an audio file or an image file, and, if it is an image file, a step 42 executes an increment of the value of the variable CtgNo by one. The variable CtgNo has an initial value "0". Then a step 43 prepares a management file with a name "CtgNo.ctg" and registers the image file name in thus prepared management file "CtgNo.ctg". If the step 41 identifies that the file to be registered is an audio file, a step 45 registers the audio file name in the management file "CtgNo.ctg". In the management file there are registered an image file name and the name of an audio file which is prepared within a period from the preparation of an image file to the immediately succeeding preparation of another image file.

In a conventional electronic camera, if an image is recorded by depression of the shutter button in a state without any recorded information in the memory device, and voice is thereafter recorded three times in succession as complementary information for the recorded image, there are prepared four image/audio files which are 1.jpg, 2.wav, 3.wav and 4.wav, and a management file 1.ctg. The management file 1.ctg registers four file names, i.e., the image file 1.jpg and the three audio files 2.wav, 3.wav and 4.wav, and 4.wav as complementary information files to the image file 1 jpg.

In the conventional configuration explained in the foregoing, a new file is prepared for every audio recording, and plural audio files may be prepared as the complementary information to an image file.

The preparation of a new audio file for every recording of audio information in the conventional art results in a drawback in that a number of audio files are prepared. Also, there results a drawback in that plural audio files are prepared as complementary information to a single image.

As a result, in order to enable satisfactory reproduction of the audio information relative to the image, there has to be prepared a link management file which contains information indicating the correspondence between the audio files and the image file.

Also, in the case of erasing an image file, there is required a cumbersome procedure, as the link management file has to be referred to at the time of erasure of the audio file.

Also, in case of searching audio files recorded in a computer readable recoding medium, for example, at a renewal time, the link management file has to be referred to in order to identify the image to which the searched audio files are complementary or to identify the presence or absence of other audio files constituting complementary information to the image to which the searched audio files are complementary.

SUMMARY OF THE INVENTION

An object of the present invention is to provide an image pickup device, a computer readable recording medium and an audio file preparing method which solve the aforementioned drawbacks.

The above-mentioned object can be attained, according to the present invention, by an image pickup apparatus capable of recording image information and audio information, entered from audio input means, where the apparatus comprises:

audio file preparing means for executing a process of preparing an audio file containing the above-mentioned entered audio information and causing memory means to store such audio file; and control means for adding, when new audio information is entered, such audio information to the stored audio file.

Another object of the present invention is to enable efficient preparation of an audio file corresponding to an image file.

Still another object of the present invention is to provide an image pickup device, a computer readable recording medium and an audio file preparing method, enabling, at the deletion of an image file, easy deletion of the audio file corresponding to the image file.

Still another object of the present invention is to provide an image pickup device, a computer readable recording medium and an audio file preparing method, having a novel function.

Still other objects of the present invention, and the features thereof, will become fully apparent from the following description which is to be taken in conjunction with the attached drawings.

BRIEF DESCRIPTION OF THE DRAWINGS

FIG. 2 is a flow chart showing a file preparing process in the first embodiment;

DESCRIPTION OF THE PREFERRED EMBODIMENTS

Now the present invention will be clarified in detail by preferred embodiments thereof shown in the attached drawings.

Figure 10:
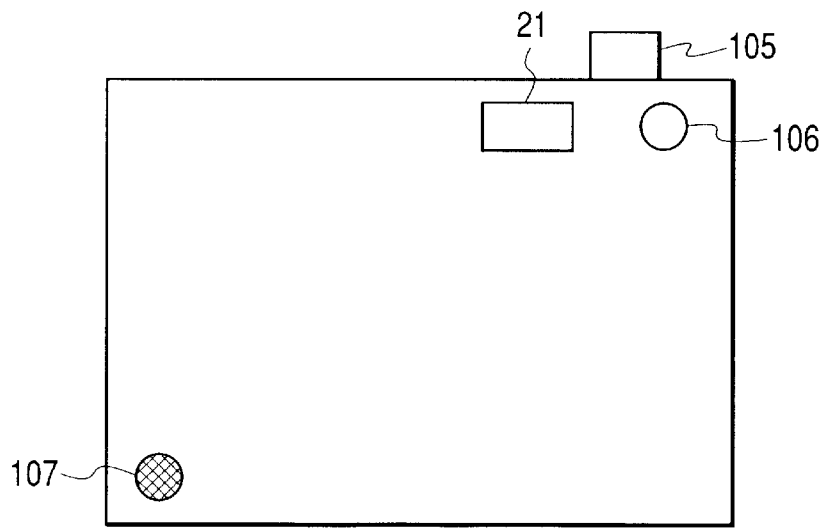
FIG. 10 is a rear view of an electronic camera in the first embodiment of the present invention.
Figures 13, 14, 15:
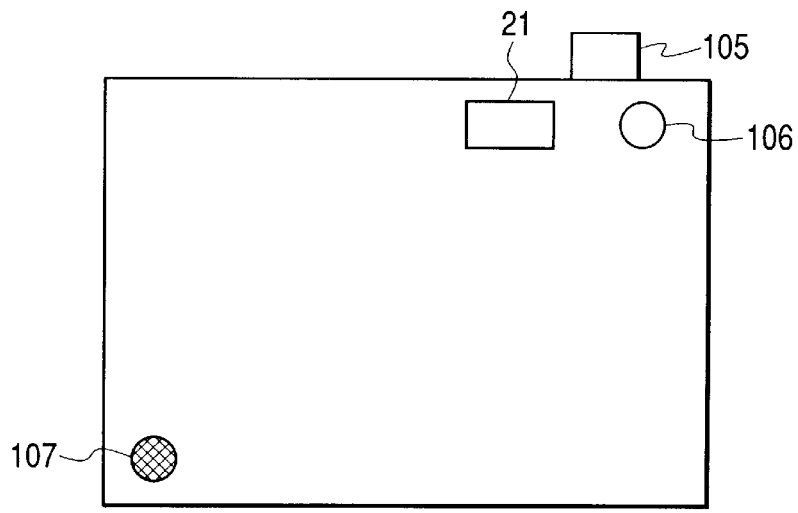
FIG. 13 is a rear view of a conventional electronic camera.
FIG. 14 is a view showing an example of a list of the files recorded in a recording medium according to an embodiment of the present invention.
FIG. 15 is a view showing the format of a renewal time in FIG. 14.

FIG. 10 shows an electronic camera constituting a first embodiment of the present invention, wherein components equivalent in function to those in FIG. 13 are represented by same numbers as in FIG. 13.

Referring to FIG. 10, after an image is captured by the depression of the shutter button 105, audio/voice may be entered into the microphone 107 during the depression of the recording button 106, and the audio information can be stored in the memory device of the electronic camera, as complementary information to the latest captured image. The recording of the audio information is terminated when the recording button 106 is released. Audio information constituting complementary information to the latest captured image may be added by depressing the recording button 106 in succession. The audio information cannot be recorded in a sate in which no image has been captured.

Figure 1:
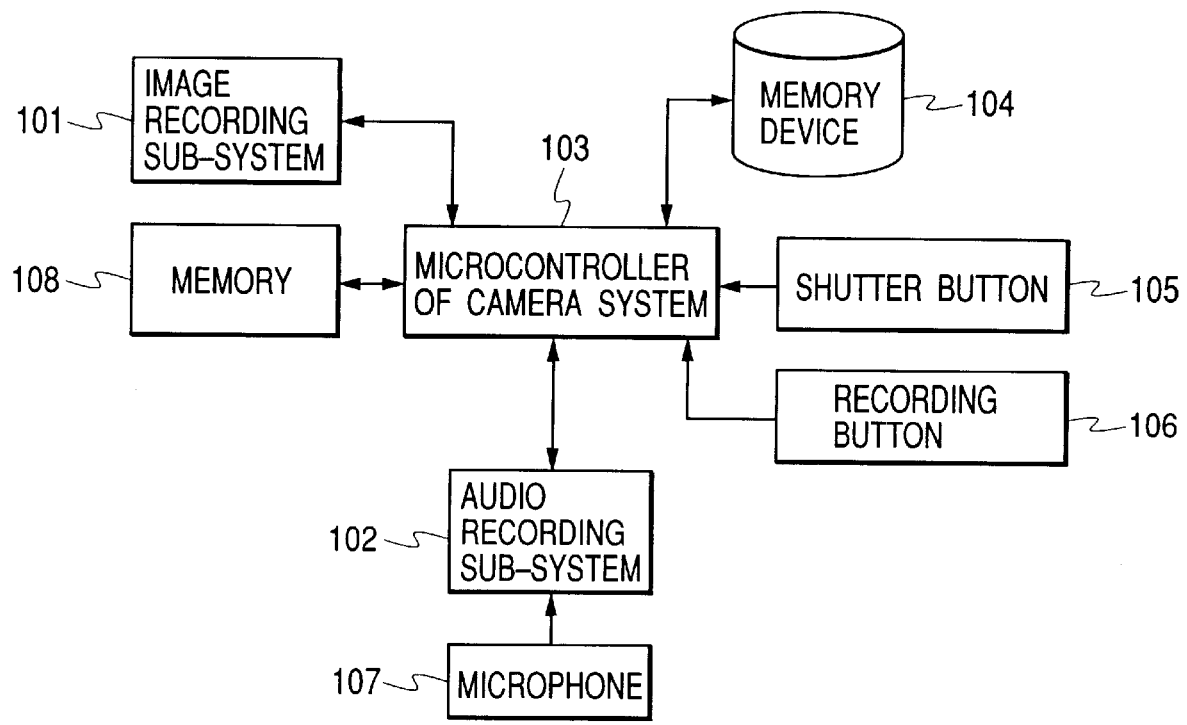
FIG. 1 is a block diagram showing a first embodiment of the present invention.

FIG. 1 is a block diagram of the electronic camera of the first embodiment.

Referring to FIG. 1, when the shutter button 105 is depressed by the user, corresponding information is given to a microcontroller 103 of the camera system. The microcontroller 103 has a microprocessor that instructs an image capture to an image recording subsystem 101, and image data captured by the image recording subsystem 101 is stored as an image file, in a memory device 104, such as a compact flash memory.

Also, when the recording button 106 is depressed by the user, corresponding information is given to the microcontroller 103 of the camera system, whereupon the microcontroller 103 instructs the start of capture of audio data to an audio recording subsystem 102. When the recording button 106 is released and is turned off, the microcontroller 103 instructs the termination of capture of audio data to the audio recording subsystem 102. Audio data captured by the audio recording subsystem 102 is stored as an audio file in the memory device 104.

The recording method for the image and audio information will not be explained in detail as it is already well known to those skilled in the art, but it may, for example, be achieved by the method disclosed in the Japanese Patent Application Laid-Open No. 7-184160.

A memory medium 108, storing the program for the microprocessor of the microcontroller 103 to execute a process to be explained later, is composed of a semiconductor memory such as a ROM, but it may also be composed of, for example, a floppy disk, a hard disk, an optical disk, a magneto-optical disk, a CD-ROM, a non-volatile memory card, a magnetic recording medium, etc.

FIG. 2 is a flow chart of a file preparing process to be executed by the microprocessor based on the program stored in the memory 108.

At first a step 50 initializes a variable FileNo, which is retained in a non-volatile writable-readable memory such as an EEPROM in the microcontroller 103 and is set at "0" at the shipment of the camera. The initialization is achieved by searching the files stored in the memory device 104 and acquiring the largest value of the prefixes of the stored image files. The acquired value is retained in a variable FileNo-Found. Then the variable FileNo and the variable FileNo-Found are compared and the larger one is set as the FileNo.

As an example, if FileNo is 0 and FileNoFound is 4, the FileNo is set at 4.

The a step 51 discriminates whether image data or audio data is to be recorded, and, in the case of image data, a step 52 executes an increment of the variable FileNo by one. The variable FileNo thus increased is reset and retained in the memory. Then a step 53 prepares an image file "FileNo.jpg".

By the above-explained steps 50, 51, 52 and 53, all the file names of the image files prepared throughout the life of the camera become unique, and no plural image files are prepared with a same file name.

Throughout the life of the camera, no plural image files are prepared with a same file name, even in a case where the memory device 104 is composed of a detachable memory medium, such as a CF (compact flash) memory card. Also, no image files having a file name that is the same as that of an image file already present in the memory device 104 will be prepared.

In a case where the step 51 identifies the recording of audio data, a step 54 discriminates whether the value of the variable FileNo is 0, in order to identify-whether any image has already been captured. If it is 0, indicating the absence of any captured image, the sequence is terminated without preparation of the audio file.

If the step 54 identifies that the value of the variable FileNo is not 0, indicating that an image is already present, a step 55 discriminates whether "FileNo.wav" is present, in order to identify whether an audio file is present as complementary information to the image file "FileNo jpg". If "FileNo.wav" is absent, there is no audio file as the complementary information to the image file "FileNojpg", so that step 56 prepares an audio file "FileNo.wav" as the complementary information to the image file "FileNo jpg".

At the recording of the audio information, if the step 55 identifies that a complementary information file "FileNo.wav" is already present for the image file "FileNojpg", the newly recorded audio information is added to the end of the already existing file "FileNo.wav".

In summary, by providing the audio recording after the preparation of an image file "FileNojpg" by the depression of the shutter button, there is prepared an audio file "FileNo.wav". Audio data thereafter recorded, prior to a new image recording by the depression of the shutter button, is added to the end of the already prepared audio file "FileNo.wav".

The file name of the audio file prepared in the camera, being determined by the prefix of the image file, also becomes unique, as in the case of the image file name. Throughout the life of the camera, there will be prepared no plural audio files having the same file name.

Throughout the life of the camera, no plural audio files are prepared with the same file name, even in a case where the memory device 104 is composed of a detachable memory medium, such as a CF (compact flash) memory card. Also, no audio files having a file name that is the same as that of an audio file already present in the memory device 104 will be prepared.

In a system in which the file numbers are reset after the preparation of files of a predetermined number (for example 100) and new files subsequently are prepared starting from a file No.1, there will be present two files numbered as No.1, respectively prepared at a first time and at a second time. Therefore, in the case of searching for an image file FileNo.1.jpg corresponding to an audio file FileNo.1.wav, there will be found two image files FileNo.1.jpg and satisfactory file management cannot be expected.

The present embodiment can avoid such drawback, since no plural files of a same file name are prepared.

The presence of an audio file constituting the complementary information to the image file "FileNo.jpg" can be identified by discriminating the presence of a file "FileNo.wav" having a same prefix "FileNo." as that of the image file "FileNo.jpg". If such file is absent, the image file "FileNo.jpg" does not have the audio file as the complementary information, but, if such file "FileNo.wav" is present, the image file "FileNo.jpg" has an audio file as the complementary information, which is identified as the file "FileNo.wav".

The present embodiment provides only one audio file as the complementary information to an image file, since, if new audio information is recorded for the image for which the audio information is already recorded as the complementary information, such newly recorded audio information is added to the end of the already existing audio file.

Also, as all the files prepared are given unique image/audio file names throughout the life of the camera, it is rendered possible to identify, from the file name of the audio file, the image file for which the audio file constitutes. the complementary information.

In the following there will be explained a second embodiment.

Figure 3:
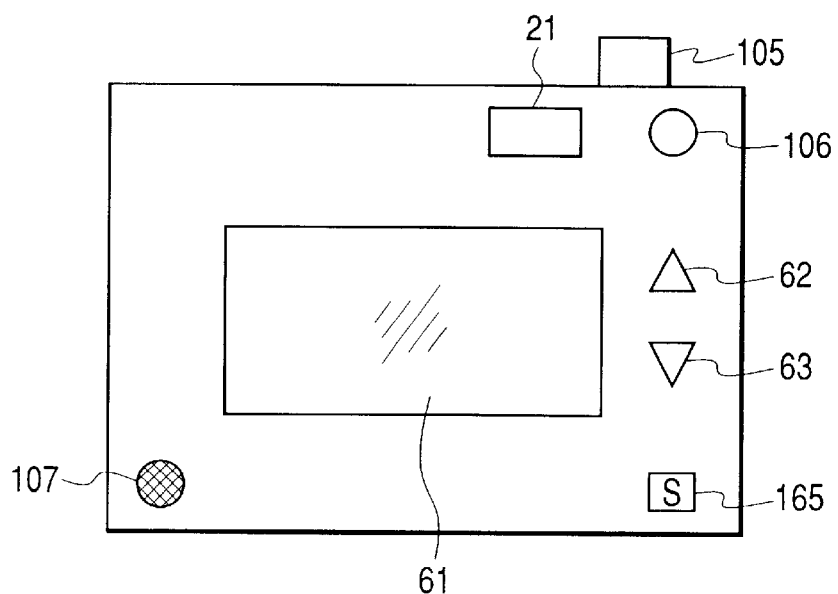
FIG. 3 is a rear view of an electronic camera in a second embodiment of the present invention.

FIG. 3 is a rear view of an electronic camera constituting the second embodiment, which is different from the foregoing first embodiment in the addition of a liquid crystal panel 61, an upward button 62 and a downward button 63. The liquid crystal panel 61 serves as a user interface for inquiry, etc., from the camera to the user, where the upward and downward buttons 62, 63 are to be used by the user for process selection in response to an inquiry from the liquid crystal panel 61 of the camera.

Figure 4:
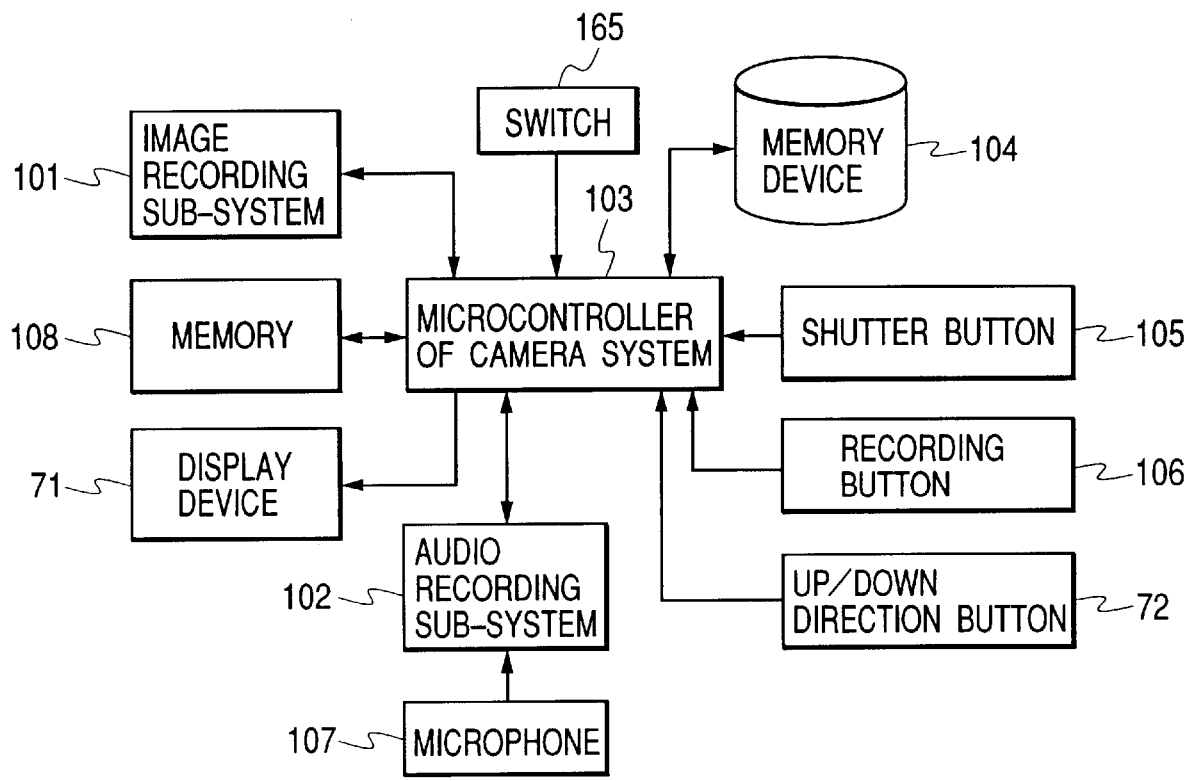
FIG. 4 is a block diagram of the second embodiment.

FIG. 4 is a block diagram of the electronic camera of the second embodiment, which is different from the foregoing first embodiment in the addition of a display device 71 utilizing the above-mentioned liquid crystal panel 61, and up/down buttons 72 consisting of the above-mentioned upward button 62 and downward button 63. When necessary, the microcontroller 103 of the camera system displays, on the display device 71, information of the camera required by the user.

Figure 5:
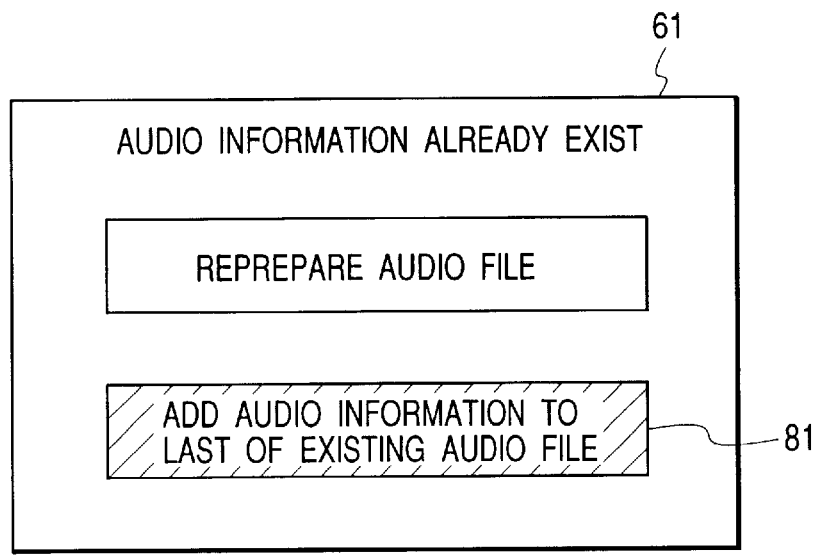
FIG. 5 is a view showing an example of the image requesting the selection of the audio file preparing methods by the user.

In the first embodiment, if audio data is recorded for an image for which the audio file is already recorded as complementary information, such audio data is always added to the end of the existing audio file. In the second embodiment, as shown in FIG. 5, the liquid crystal panel 61 displays an image asking the user whether the audio data to be recorded is to be added to the end of the already existing audio file or if the audio file is to be prepared anew, and a process designated by the user is executed. The user selects the process by the upward button 62 or the downward button 63. The selected process 81 is displayed in an emphasized manner, in order to inform the user of the selected process. The selected process is executed by the depression of the shutter button 105 by the user.

The file preparing process is similar to that shown in FIG. 2, except for the step 57 for adding the recorded audio data to the end of the existing audio file.

Figure 6:
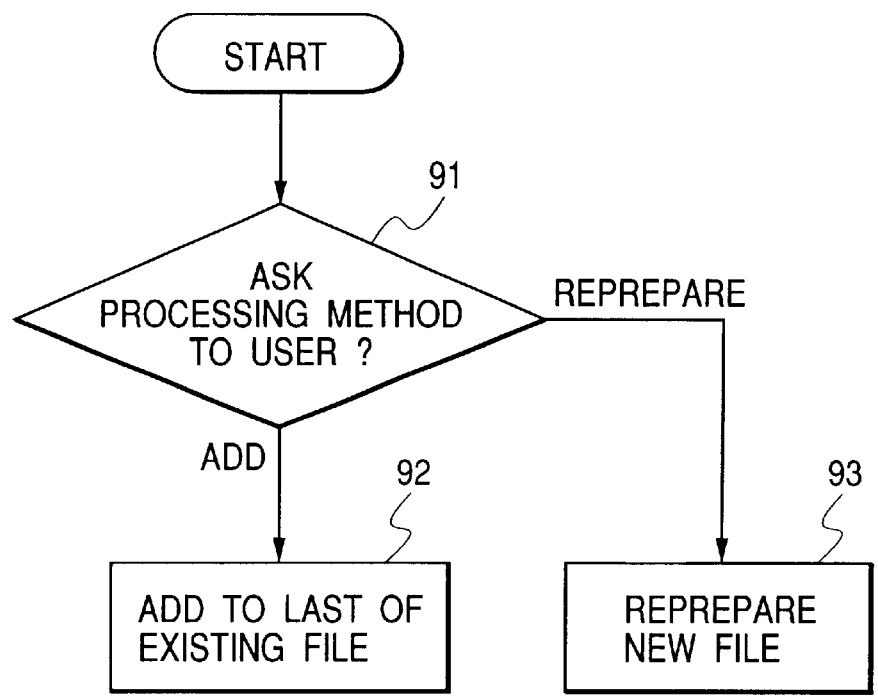
FIG. 6 is a flow chart showing the functions of the second embodiment.

The step 57 is replaced by a process shown in FIG. 6, in which, at first, a step 91 inquires of the user, by a display as shown in FIG. 5 on the liquid crystal panel 61, the desired process. If the user instructs that the recorded audio data is to be added to the end of the existing file, a step 92 adds the audio data to the end of the existing file, but, if the user instructs that the audio file is to be prepared anew, a step 93 re-prepares the file and stores the recorded audio data in the re-prepared file.

In the present embodiment, in a case where the user instructs the audio recording for an image which already has an audio file as complementary information, the camera inquires of the user whether the audio recording is to be added to the end of the existing file or is to be re-prepared anew, and the user is allowed to make a selection.

The operator may wish to maintain secrecy of the added audio file.

For this purpose, the electronic camera is provided with a security switch 165.

In response to the manipulation of the security switch 165 by the operator, the liquid crystal panel 61 displays an image for password entry. The operator enters a password by a desired combination of the depressions of the upward button 62 and the downward button 63 (for example two depressions of the button 62 followed by three depressions of the button 63).

The audio data recorded by the operator after such password entry is not recorded in the form of "addition to the end of the existing file" but recorded as a separate file.

The audio data of such a separate file cannot be reproduced without the entry of the above-mentioned password.

In the following there will be explained a third embodiment.

Figure 7:
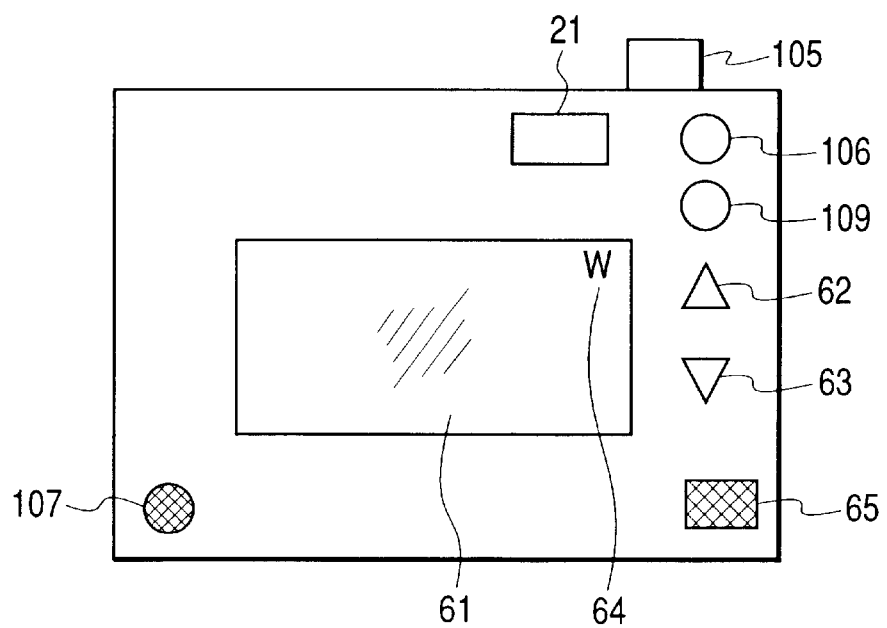
FIG. 7 is a rear view of an electronic camera in a third embodiment of the present invention.

FIG. 7 is a rear view of an electronic camera of the third embodiment, which is different from the foregoing second embodiment shown in FIG. 3 in the addition of a reproduction display button 109. In response to the depression of the reproduction display button 109, the latest recorded image is displayed on the liquid crystal panel 61. If the upward button 62 is depressed during the display of the image on the liquid crystal panel 61, the liquid crystal panel 61 displays a next sequential image and, if the downward button 63 is depressed in this state, the liquid crystal panel 61 displays an image taken immediately before the currently displayed image.

Figure 8:
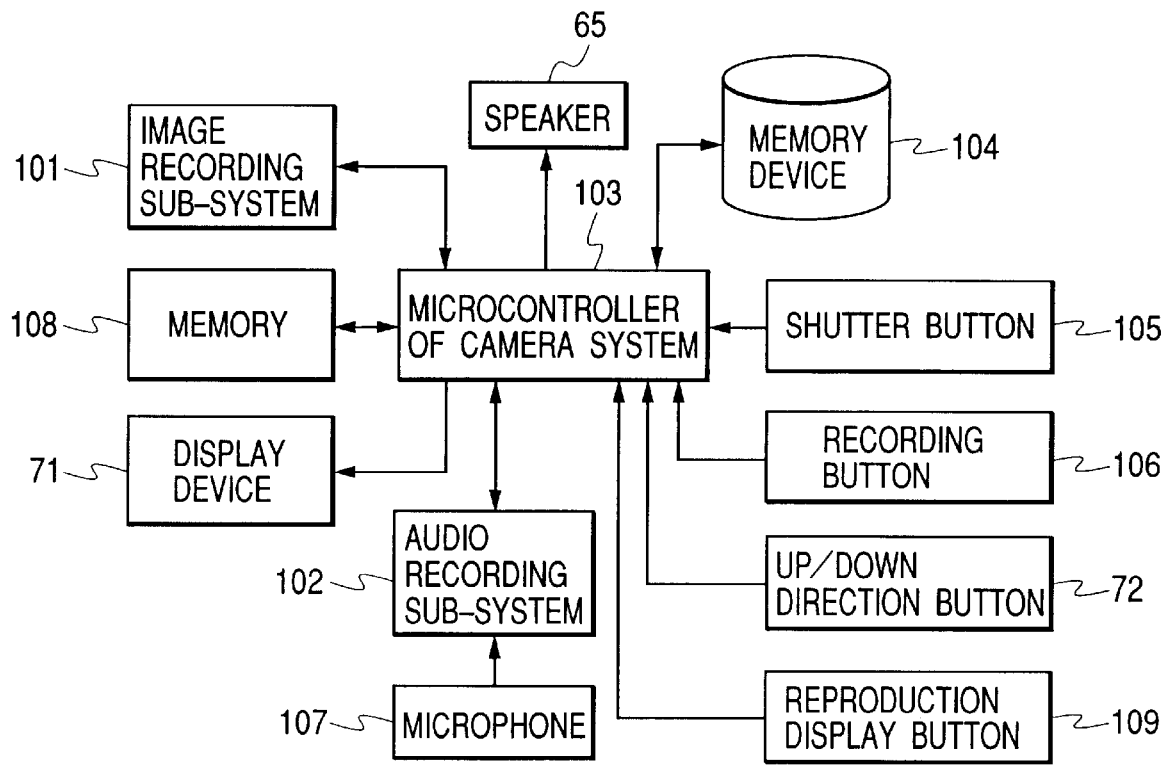
FIG. 8 is a block diagram of the third embodiment.

FIG. 8 is a block diagram of the electronic camera of the third embodiment, which is different from the second embodiment shown in FIG. 4 in the addition of a reproduction display button 109. In response to the depression of the reproduction display button 109, the microcontroller 103 of the camera system displays the image. If the up/down buttons 72 consisting of the upward button 62 and the downward button 63 are depressed during the display of the image on the display device 71, an image taken before or after the currently displayed image on the display device 71 is displayed thereon. If the upward button 62 is depressed, the microcontroller 103 of the camera system reads, from the memory device 104, an image taken immediately after the currently displayed image and displays such read image on the display device 72. If the downward button 63 is depressed, the microcontroller 103 of the camera system reads, from the memory device 104, an image taken immediately before the currently displayed image and displays such read image on the display device 72.

The foregoing first and second embodiments allow addition of audio information as complementary information only to the latest image file, but the present third embodiment allows a user to prepare and add audio information as complementary information to an image file other than the latest one. More specifically, it is rendered possible to display a captured image on the liquid crystal display and to newly prepare or add audio information to the displayed image. The liquid crystal display can display not only the latest captured image but also images taken in the past, so that audio information can be added as complementary information not only to the latest captured image but to all image files stored in the memory device.

Figure 9:
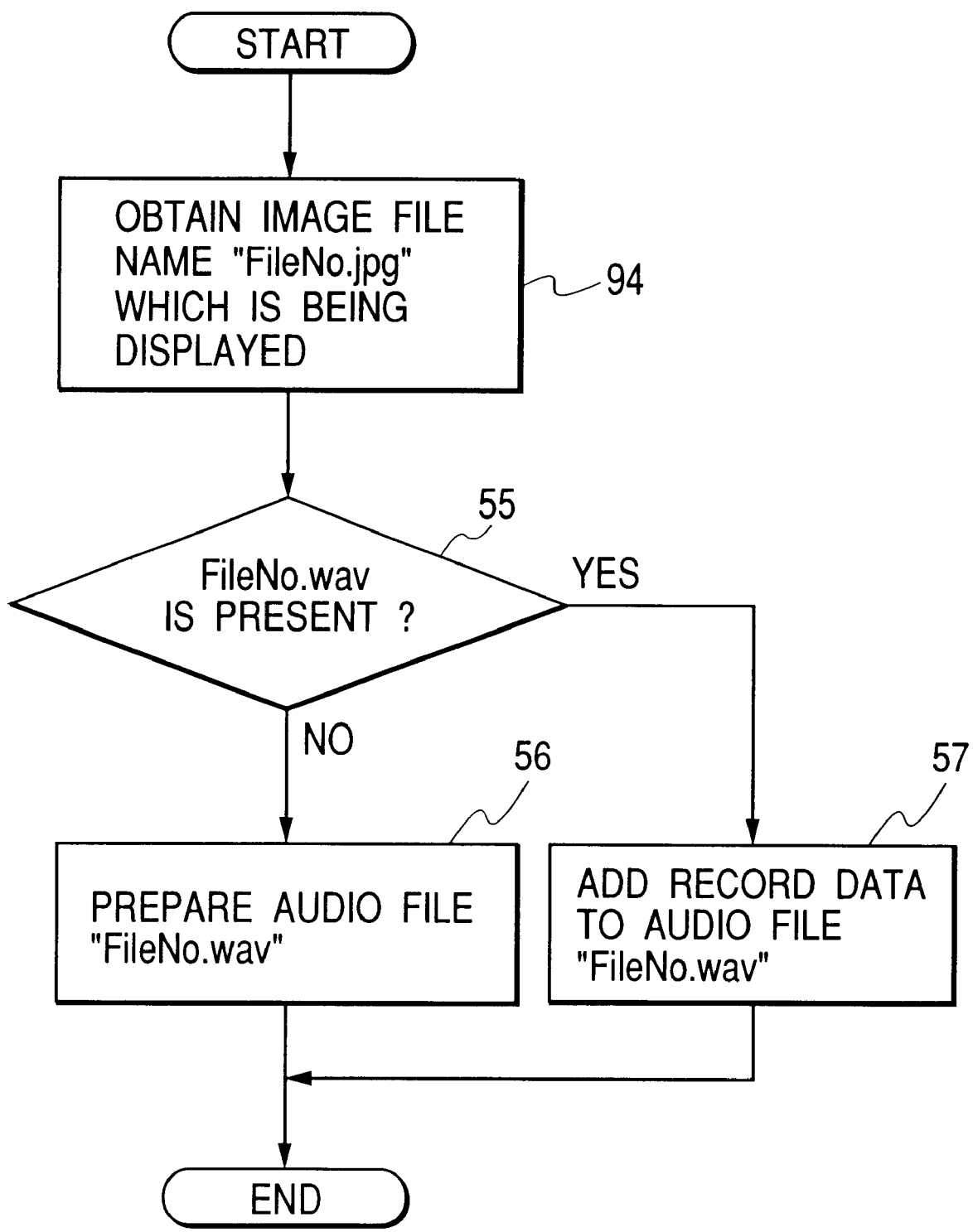
FIG. 9 is a flow chart showing a file preparing process in the third embodiment.

FIG. 9 is a flow chart showing the audio file preparing process in the case where the recording button 106 is depressed while an image is reproduced/displayed on the liquid crystal panel 61. At first a step 94 acquires the file name "FileNojpg" of the image file displayed on the liquid crystal panel 61. Then step 55 discriminates whether an audio file "FileNo.wav" is present. If absent, the image file "FileNojpg" currently displayed on the liquid crystal panel 61 does not have an audio file as complementary information, so that a step 56 prepares anew an audio file "FileNo.wav" as the complementary information to the image file "FileNojpg".

On the other hand, if the step 55 identifies that an audio file "FileNo.wav" is present as complementary information to the image file currently displayed on the liquid crystal panel 61, a step 57 adds the newly recorded audio information to the end of the already existing audio file "FileNo.wav". The steps 55 to 57 are identical to those shown in FIG. 2.

The operator can also recognize whether an audio file "FileNo.wav" is present as the complementary information to the image file.

At each change of the image file taken out from the memory device by manipulation of the upward button 62 and the downward button 63, the microprocessor of the camera system identifies whether an audio file is present corresponding to the read image file. If an audio file is present, a mark "W" indicating the presence of the audio file is displayed, overlapping the image displayed on the liquid crystal panel, as represented by 64 in FIG. 7.

As the mark W allows the operator to identify the presence of an audio file corresponding to the displayed image, the operator can reproduce the existing audio file by a reproduction unit 65 and can make an addition to the audio file after confirming the necessity of such addition.

The present third embodiment can also employ the security mode as described above.

In this case, when an image having complementary information in the security mode is displayed on the liquid crystal panel 61, a mark "s" is also displayed thereon, whereby the operator can recognize the presence or absence of audio information that can only be reproduced by the entry of the password.

The mark "s" may be displayed or not by an unrepresented switch.

In the following there will be explained an embodiment in which audio files are recorded on a computer readable recording medium by the first, second or third embodiment, using a computer, based on the renewal time.

FIG. 14 shows an example of the list of files recorded by the camera on a computer readable recording medium. The list shows the file names and the renewal times, formatted as shown in FIG. 15. When the list is searched with the computer under a condition that the renewal time is Apr. 1, 1998 or thereafter, the audio file "6.wav" matches the condition. The present embodiment allows a user to identify, from the file names, that the searched audio file "6.wav" is the complementary information of the image file "6.jpg" of the same prefix.

The method of recording the renewal time on the file and the method of searching the file by the renewal time will not be explained in detail as they are already well known.

As explained in the foregoing, the first embodiment allows a user to manage plural audio information by a single audio file, thereby achieving easy file management.

Also, by preparing an audio file corresponding to the image file, there is retained only one audio file for each image file and easy file management can therefore be attained.

The second embodiment allows a user, in recording new audio information, to select whether such audio information is to be added to the existing audio file or if the audio file is to be prepared anew.

The third embodiment allows a user, upon the observation of a captured image on the display device, to record audio information as complementary information to such captured image, in the form of a file. Also, the audio data as complementary information may be recorded, not only with respect to the latest taken image, but with respect to all the image files stored in the memory device, either by preparation of a new file or by addition to the end of the existing file.

Also, the computer readable recording medium embodying the present invention can be employed in the computer process of preparing an audio file corresponding to an image file, adding newly recorded audio information to an existing audio file and repeating this process until the preparation of a new image file, whereby easy file management is attained as only one audio file is prepared for each image file.

There can also be executed a process of selecting whether the new audio information is added to an existing audio file or a new audio file is prepared.

Also, when searching for the audio files, recorded on the computer readable recording medium, by the renewal time, it is rendered possible to identify, from the file name, the image file to which the searched audio file is complementary.

What is claimed is:

1. An image pickup apparatus comprising:
   image pickup and recording means for picking up image information and recording the image information in memory;
   audio recording means for recording in memory audio information input to said image pickup apparatus; and
   control means for controlling said image pickup and recording means so as to record in memory an image file containing image information, and for controlling said audio recording means so as to record in memory a complementary audio file for the image file, wherein when additional audio information is input for an image file having a complementary audio file previously recorded in memory, the additional audio information is added to the audio information of the complementary audio file previously recorded in memory.

2. An image pickup apparatus according to claim 1, further comprising:
   selection means for selecting whether to add the additional audio information input to said image pickup apparatus to the complementary audio file previously recorded in memory, or to record the additional audio information as a new complementary audio file,
   wherein, in response to operation of said selection means, said control means selectively controls said audio recording means so as to record the additional audio information as a new complementary audio file, replacing the previously recorded complementary audio file.

3. An image pickup apparatus according to claim 1, wherein said control means controls said image pickup and recording means so as to record in memory a plurality of image files, each image file containing image information picked up by said image pickup and recording means, and controls said audio recording means so as to record in memory a plurality of complementary audio files, each including audio information corresponding to a respective one of said plurality of image files, and correspondence information indicating to which one image file each respective audio file corresponds.

4. An image pickup apparatus according to claim 3, wherein when said image pickup apparatus receives additional audio information, said control means controls said audio recording means so as to add the additional audio information to the most recently recorded audio file, until a new image file is recorded.

5. An image pickup apparatus according to claim 3, further comprising:
   display means for displaying an image corresponding to the image information of one of said plurality of image files recorded in memory, and
   wherein said control means controls said audio recording means so as to record in memory a complementary audio file for the image file corresponding to the image being displayed by said display means.

6. An image pickup apparatus according to claim 3, wherein said control means controls said audio recording means so as to record a complementary audio file for each of the plurality of image files recorded in memory.

7. A computer readable recording medium storing a program, the program comprising computer executable code for:
   preparing an image file containing input image information and storing the image file in memory; and
   preparing a complementary audio file containing input audio information corresponding to the image file, and storing the complementary audio file in memory, and further, when additional audio information is input, adding the additional audio information to the complementary audio file corresponding to the most recently stored image file until a new image file is prepared.

8. A computer readable recording medium according to claim 7, the program further comprising executable code for selecting whether to add the additional audio information to a previously stored complementary audio file corresponding to the most recently stored image file or to prepare a new complementary audio file corresponding to the most recently stored image file, replacing the previously stored complementary audio file.

9. An audio file preparing method for use in an image pickup apparatus, comprising the steps of:
   preparing an audio file including audio information input to the image pickup apparatus, complementary to a single image file stored in memory of the image pickup apparatus, and storing the audio file in memory; and
   adding any additional audio information input by the audio input means, and complementary to the image file, to the stored audio file.

10. An image pickup apparatus according to claim 1, further comprising:
    code data adding means for adding code data to the complementary audio file,
    wherein audio information of a complementary audio file recorded in memory, to which the code data is added, is not reproducible without inputting the code data.

11. An image pickup apparatus according to claim 3, wherein said control means controls said image pickup and recording means so as to assign a different file name for each of the plurality of image files.

12. An image pickup apparatus according to claim 11, further comprising:

display means for displaying an image corresponding to the image information of one of the plurality of image files recorded in memory, including informing means for informing whether a complementary audio file corresponding to the image file displayed by said display means previously has been recorded in memory; and reproducing means for reproducing the audio information of the complementary audio file previously recorded in memory.

13. An image pickup apparatus according to claim 12, further comprising:

code data adding means for adding code data to the complementary audio file, wherein the audio information recorded in the audio file to which the code data is added is not reproducible without inputting the code data, and wherein said informing means informs a user of a status of the audio file based on the presence or absence of the code data.

14. A computer readable recording medium as defined in claim 7, the program further comprising computer executable code for:

displaying on a display the image corresponding to the stored image file, in response to an instruction; and adding the audio file as complementary information for the image file displayed on the display.

15. A computer readable recording medium as defined in claim 14, the program further comprising computer executable code for:

indicating whether a complementary audio file corresponding to the image file displayed on the display previously has been stored in memory.

16. A computer readable recording medium as defined in claim 7, the program further comprising computer executable code for:

adding code data to the complementary audio file.

* * * * *

UNITED STATES PATENT AND TRADEMARK OFFICE
CERTIFICATE OF CORRECTION

PATENT NO. : 6,418,272 B1
DATED : July 9, 2002
INVENTOR(S) : Teruyuki Higashiyama It is certified that error appears in the above-identified patent and that said Letters Patent is hereby corrected as shown below:

Title page, Item [54] and Column 1, line 3,
The title should read as follows: -- IMAGE PICKUP APPARATUS, COMPUTER READABLE RECORDING MEDIUM AND METHOD FOR PREPARING AN AUDIO FILE --.

Drawings,
Sheet No. 3, Figure 5, "EXIST" should read -- EXISTS --.
Figure 5, "EXISTING AUDIO FILE" should read -- EXISTING AUDIO FILES --.
Sheet No. 4, Figure 6, "EXISTING FILE" should read -- EXISTING FILES --.

Figure 11:
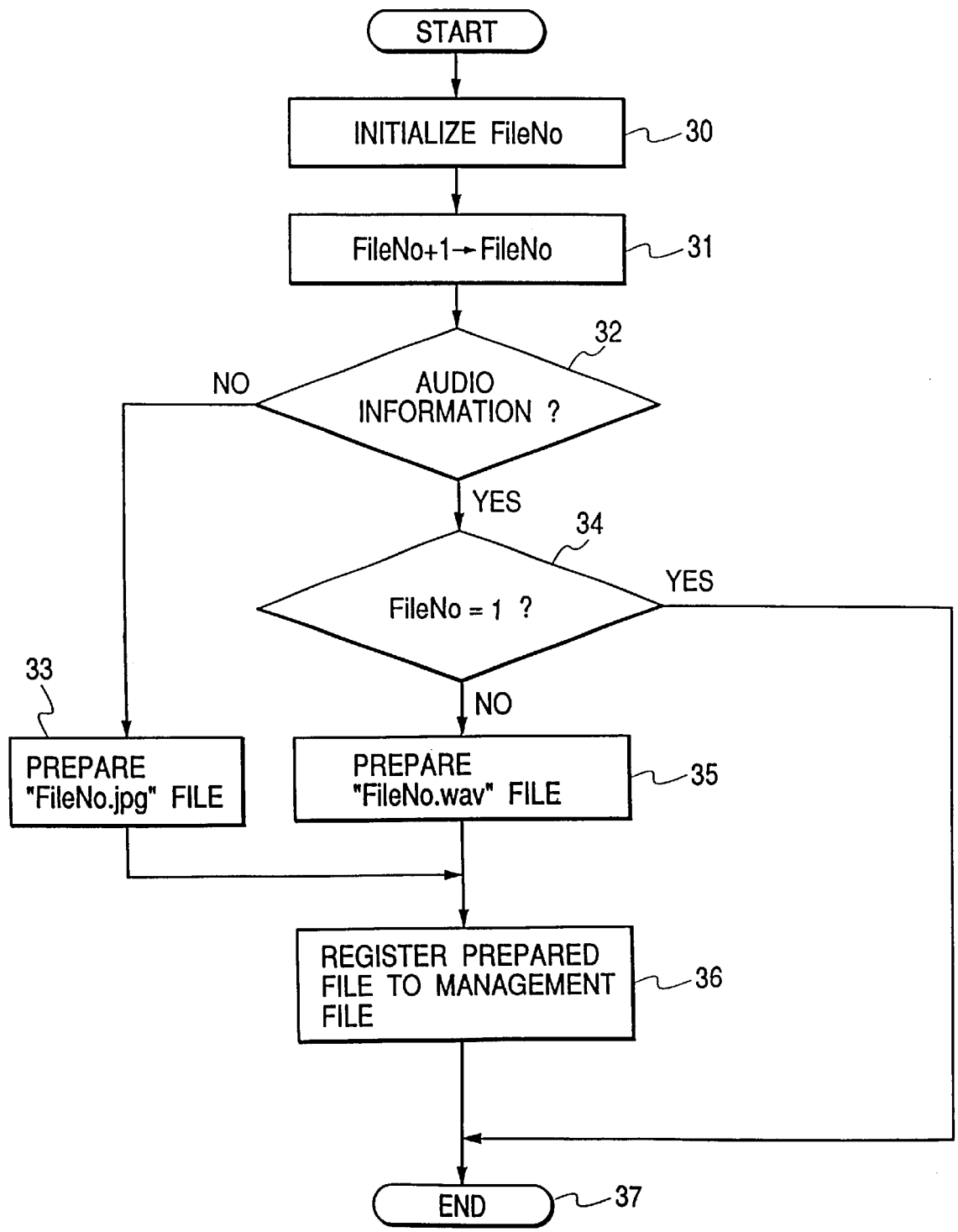
FIG. 11 is a flow chart showing a conventional file preparing process.
Figure 12:
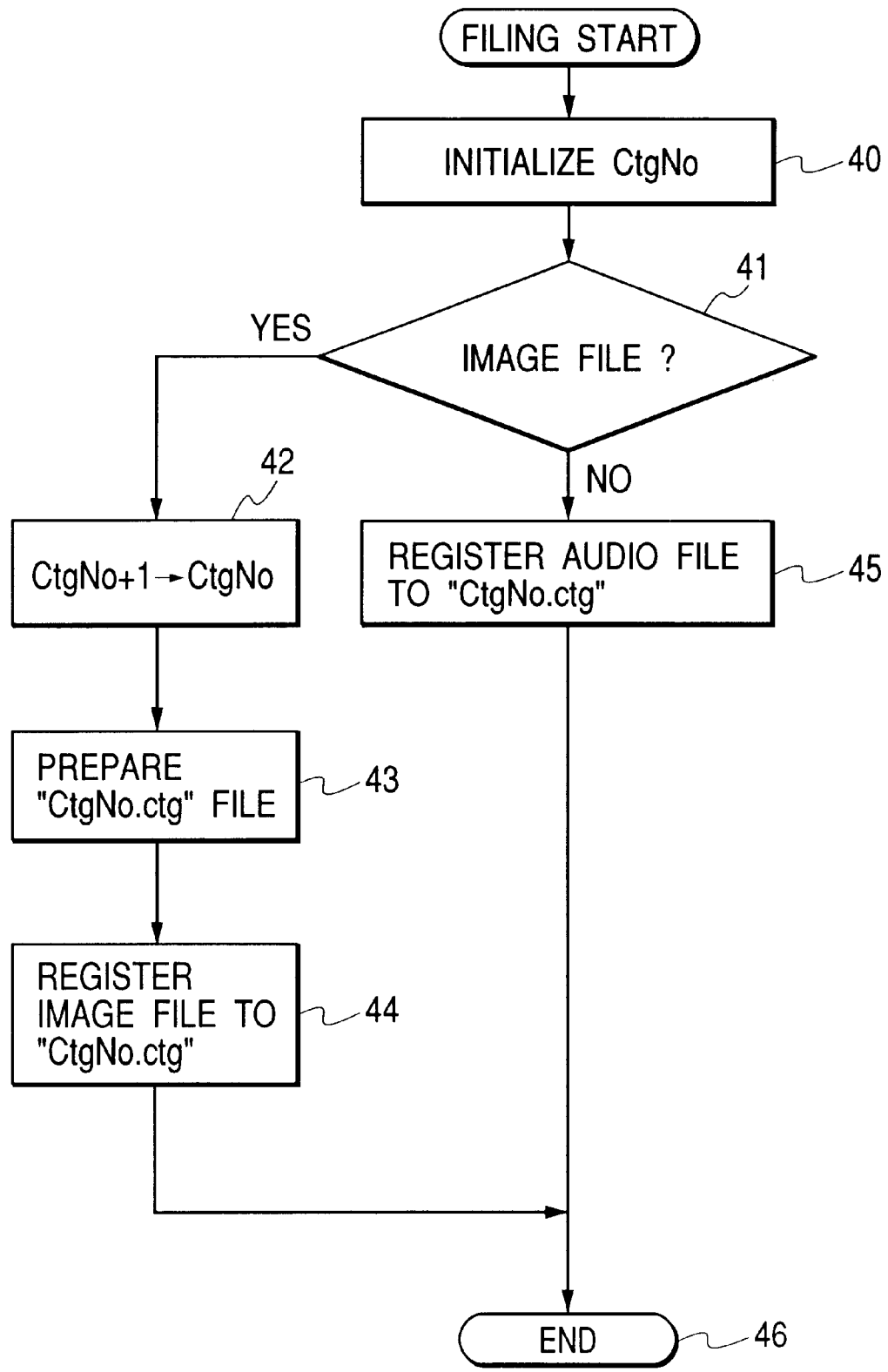
FIG. 12 is a flow chart showing a conventional registration process to the management file.

Column 1,
Line 19, "fetching" should read -- capturing --.
Line 32, "captured.¶" should read -- captured. ¶ Fig. 11 is a flow chart showing a file preparation process by the conventional image/audio recording. --.

Column 2,
Line 61, "recoding" should read -- recording --.

Column 5,
Line 3, "The" should read -- Then --.
Line 21, "identify-whether" should read -- identify whether --.
Line 29, ""FileNo jpg"." should read -- "FileNo. jpg". --.
Line 31, ""FileNojpg"," should read -- "FileNo. jpg", --.
Line 33, ""FileNojpg"," should read -- "FileNo. jpg", --.
Line 36, ""FileNo jpg"," should read -- "FileNo. jpg", --.
Line 40, ""FileNojpg","  should read -- "FileNo.jpg" --.

Column 6,
Line 22, "constitutes." should read -- constitutes --.

UNITED STATES PATENT AND TRADEMARK OFFICE
CERTIFICATE OF CORRECTION

PATENT NO. : 6,418,272 B1
DATED : July 9, 2002
INVENTOR(S) : Teruyuki Higashiyama It is certified that error appears in the above-identified patent and that said Letters Patent is hereby corrected as shown below:

<u>Column 8,</u>
Line 11, ""FileNojpg" should read -- "FileNo.jpg". --.
Line 14, ""FileNojpg" should read -- "FileNo.jpg". --.
Line 18, ""FileNojpg" should read -- "FileNo.jpg". --.

Signed and Sealed this

Fourteenth Day of January, 2003

JAMES E. ROGAN
*Director of the United States Patent and Trademark Office*